United States Patent
Li et al.

(10) Patent No.: US 7,315,677 B1
(45) Date of Patent: Jan. 1, 2008

(54) DUAL DOPANT DUAL ALPHA MULTIMODE OPTICAL FIBER

(75) Inventors: Ming-Jun Li, Horseheads, NY (US); Daniel Aloysius Nolan, Corning, NY (US); Pushkar Tandon, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 11/521,022

(22) Filed: Sep. 14, 2006

(51) Int. Cl.
*G02B 6/02* (2006.01)

(52) U.S. Cl. ...................................... 385/123; 385/142
(58) Field of Classification Search ...................... None
See application file for complete search history.

(56) References Cited

U.S. PATENT DOCUMENTS

| | | | |
|---|---|---|---|
| 4,222,631 A | 9/1980 | Olshansky | 385/124 |
| 2005/0053351 A1 | 3/2005 | Guan et al. | 385/142 |
| 2005/0063653 A1 | 3/2005 | Matthijse et al. | 385/123 |
| 2006/0285809 A1* | 12/2006 | Bickham et al. | 385/123 |
| 2007/0189699 A1* | 8/2007 | Matsuo et al. | 385/142 |

FOREIGN PATENT DOCUMENTS

EP 1503230 A1 7/2004

OTHER PUBLICATIONS

R. Olshansky, "Mode coupling effects in graded-index optical fibers", Applied Optics vol. 14, pp. 935-945, 1975.
R. Olshansky, "Multiple-α index profile", Applied Optics vol. 18, pp. 683-689, 1979.
I.P. Kaminow and H.M. Presby, "Profile synthesis in multicomponent glass optical fibers", Applied Optics vol. 16, pp. 108-112, 1977.

* cited by examiner

Primary Examiner—Sung Pak
(74) Attorney, Agent, or Firm—Joseph M. Homa; Matthew J. Mason

(57) ABSTRACT

Multimode optical fiber is disclosed herein comprising germania and fluorine co-doped in the core of the fiber. The dopant concentration profiles are defined by a pair of alpha parameters. The operating window, or bandwidth window, is enlarged and attenuation, or loss, is low. In some embodiments, two operating windows are available for transmission.

20 Claims, 8 Drawing Sheets

DUAL DOPANT DUAL ALPHA MULTIMODE OPTICAL FIBER

BACKGROUND OF THE INVENTION

1. Field of the Invention

The present invention relates generally to optical fiber, and particularly to graded index multimode fibers.

2. Technical Background

The bandwidth of multimode fibers (MMF) is limited mostly by inter-modal chromatic dispersion. To minimize the inter-modal chromatic dispersion, MMF are designed with graded index $\alpha$-profiles. For optimum bandwidth, the parameter $\alpha$ is about 2. However the optimized $\alpha$ value depends on wavelength due to the material dispersion. Because the bandwidth is very sensitive to profile change from its optimum shape, the operating window with high bandwidth is very narrow.

The bandwidth can be increased with multiple dopants. Known fibers utilize co-doping of germanium and boron. However, boron increases fiber attenuation, increasing the transmission losses of the MMF. Other known multimode fibers have at least one dopant which has lower concentration in the fiber axis than concentration in the region of light guiding core.

SUMMARY OF THE INVENTION

Multimode optical fiber is disclosed herein comprising germania ($GeO_2$) and fluorine co-doped in the core of the fiber. The dopant concentration profiles are defined by a pair of alpha parameters, which in some embodiments may be equal to each other. The operating window, or bandwidth window, is enlarged and attenuation, or loss, is low. In some embodiments, two operating windows are available for transmission.

Each of the dual dopants, germania and fluorine, are disposed in the core of the multimode fiber in concentrations which vary with radius and which are defined by two alpha parameters, $\alpha 1$ and $\alpha 2$. That is, the germania dopant concentration varies with radius as a function of the alpha parameters, $\alpha 1$ and $\alpha 2$, as does the fluorine dopant concentration. The dual dopant concentrations disclosed herein also reduce the sensitivity with wavelength of the overall $\alpha$ shape of the refractive index of the optical fiber, which can help increase the productivity yield of such fibers during their manufacture, thereby reducing waste and costs. As used herein, the term graded index refers to a multimode optical fiber with a refractive index having an overall $\alpha$ of about 2.

In some embodiments, the MMF disclosed herein comprises a refractive index profile which provides an RMS pulse broadening of less than 0.02 ns/km over wavelength window width of at least 0.04 µm, preferably at least 0.05 µm, more preferably at least 0.10 µm, and even more preferably at least 0.15 µm, wherein the window is centered at about 0.85 µm. In some embodiments, an RMS pulse broadening of less than 0.02 ns/km is provided over a wavelength window width of at least 0.20 µm, and the window is preferably centered at about 0.85 µm.

In some embodiments, the MMF disclosed herein comprises a refractive index profile which provides an RMS pulse broadening of less than 0.02 ns/km over a wavelength window width of at least 0.10 µm, preferably at least 0.20 µm, more preferably at least 0.25 µm, and even more preferably at least 0.30 µm, wherein the window includes 0.85 µm. In some of these embodiments, the window is not centered at 0.85 µm; in some embodiments, the portion of the window centered at 0.85 µm is at least 100 nm wide and the extended window is at least 200 nm wide; in other embodiments, the portion of the window centered at 0.85 µm is at least 100 nm wide and the extended window is at least 300 nm wide.

In some embodiments, the MMF disclosed herein comprises a refractive index profile which provides an RMS pulse broadening of less than 0.02 ns/km over wavelength window widths of at least 50 nm in at least two windows. In some of these embodiments, a first window is centered at about 0.85 µm and a second window is centered between about 1.1 µm and 1.6 µm. In one set of embodiments, a first window is centered at about 0.85 µm and a second window is centered at a wavelength less than about 1.4 µm. In another set of embodiments, a first window is centered at about 0.85 µm and a second window is centered at a wavelength less than about 1.56 µm.

Reference will now be made in detail to the present preferred embodiments of the invention, examples of which are illustrated in the accompanying drawings.

DETAILED DESCRIPTION OF THE PREFERRED EMBODIMENT

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is the average refractive index of the cladding. As used herein, the relative refractive index is represented by $\Delta$ and its values are given in units of "%", unless otherwise specified. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. One or more other dopants which are not updopants may be present in a region of an optical fiber having a positive relative refractive index. A downdopant may be present in a region of an optical fiber having a positive relative refractive index when accompanied by one or more other dopants which are not downdopants.

Figure 1:
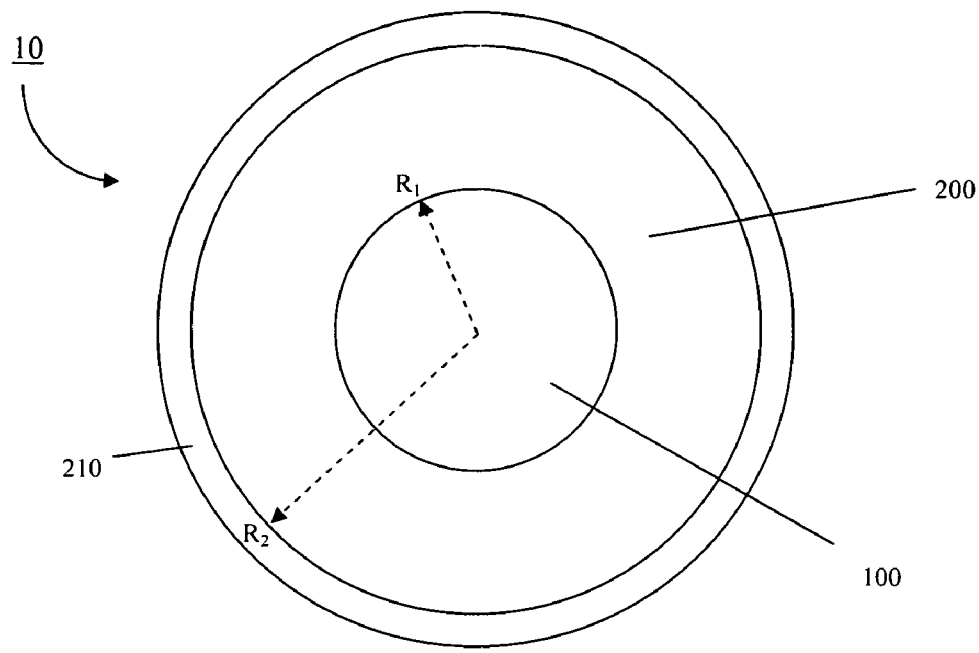
FIG. 1 schematically illustrates a cross-sectional view of an optical fiber as disclosed herein.

As depicted in FIG. 1, the optical fiber 10 disclosed herein comprises a core 100 and a cladding layer (or cladding) 200 surrounding and directly adjacent (i.e. in contact with) the core. The core 100 extends from a centerline at r=0 to an outermost core radius, $R_1$. The cladding 200 has a refractive index profile, $\Delta_{CLAD}(r)$. The cladding 200 extends from $R_1$ to an outermost cladding radius, $R_2$. In some embodiments, the cladding 200 comprises pure (undoped) silica. In some embodiments, the cladding 200 comprises fluorine doped silica. The core and the cladding form the glass portion of the optical fiber. In some embodiments, the cladding is coated with one or more coatings 210, for example with an acrylate polymer.

The core 100 comprises silica doped, i.e. co-doped, with germania and fluorine sufficient to provide a graded-index refractive index profile. The germania is disposed in the core 100 of the graded index multimode optical fiber with a germania dopant concentration profile, $C_1(r)$. The core 100 has a center germania concentration at the centerline, $C_{11}$, greater than or equal to 0, and an outermost germania concentration, $C_{12}$, at $R_1$, wherein $C_{12}$ is greater than or equal to 0.

The fluorine is disposed in the core 100 of the graded index multimode optical fiber with a fluorine dopant concentration profile, $C_2(r)$. The core 100 has a center fluorine concentration at the centerline, $C_{21}$, greater than or equal to 0, and an outermost fluorine concentration $C_{22}$, at $R_1$, wherein $C_{22}$ is greater than or equal to 0.

The germania dopant concentration profile, $C_1(r)$, is defined by the following equation:

$$C_1(r) = C_{11} - (C_{11} - C_{12})(1 x_1) r^{\alpha 1} - (C_{11} - C_{12}) x_1 r^{\alpha 2}.$$

The fluorine dopant concentration profile, $C_2(r)$, is defined by the following equation:

$$C_2(r) = C_{21} - (C_{21} - C_{22}) x_2 r^{\alpha 1} - (C_{21} - C_{22})(1 - x_2) r^{\alpha 2}.$$

The dual alpha parameters, $\alpha 1$ and $\alpha 2$, are each about 2. In some embodiments, $1.90 < \alpha 1 < 2.10$, and $1.90 < \alpha 2 < 2.10$.

The dopant profile parameters, $x_1$ and $x_2$, are preferably each between −10 and +10.

If $n_{11}$ and $n_{21}$ are the refractive indices in the center of the fiber core corresponding to dopants 1 and 2, respectively, $n_{12}$ and $n_{22}$ are the refractive indices at the edge of fiber core corresponding to dopants 1 and 2, respectively, $n_s$ is the refractive index of pure silica, and $n_0^2 = n_{11}^2 + n_{21}^2 - n_s^2$, then the following parameters can be defined: $\delta_{11} = n_{11}^2 - n_s^2$, $\delta_{12} = n_{12}^2 - n_s^2$, $\delta_{21} = n_{21}^2 - n_s^2$, $\delta_{22} = n_{22}^2 - n_s^2$, and;

$$\Delta_1 = [\delta_{11} - \delta_{12})(1 - z_1) + (\delta_{21} - \delta_{22}) x_2] 2 n_0^2, \text{ and}$$

$$\Delta_2 = [(\delta_{11} - \delta_{12}) x_1 + (\delta_{21} - \delta_{22})(1 - x_2)]/2 n_0^2$$

and the refractive index profile for an optical fiber doped with two donates is:

$$n_1^2(r) = n_0^2 (1 - 2 \delta_1 r^{\alpha 1} - 2 \Delta_2 r^{\alpha 2}).$$

In one group of embodiments, the germania concentration anywhere in the core 100 is no more than 20 wt % germania, i.e. $C_1(r) \leq 20$ wt % germania, or $C_{1MAX} \leq 20$ wt % germania, and the fluorine concentration anywhere in the core (for all values of r from r=0 to r=$R_1$) is no more than 4 wt % fluorine, i.e. $C_2(r) \leq 4$ wt % fluorine, or $C_{2MAX} \leq 4$ wt % fluorine. In some embodiments, the germania concentration the core 100, in wt %, varies between 0 and 10, and in other embodiments, between 0 and 6, and in other embodiments, between 8 and 18, and in still other embodiments, between 10 and 18. In some embodiments, the fluorine concentration in the core 100, in wt %, varies between 0 and 3, and in other embodiments, between 0 and 2, and in other embodiments, between 1 and 4.

In some embodiments, fluorine is present at $R_1$ and germania is not, i.e. $C_{22}$ is greater than 0 and $C_{12}$ is equal to 0. In these embodiments, the cladding 200 comprises fluorine to match the refractive index of the core at r=$R_1$.

In some embodiments, both germania and fluorine are present at $R_1$, i.e. $C_{22}$ is greater than 0 and $C_{12}$ is greater than 0. In these embodiments, the cladding 200 may either comprise fluorine to match the refractive index of the core at r=$R_1$, or the cladding 200 may comprise no fluorine in embodiments with sufficient index-increasing germania at $R_1$ to offset the index decrease due to the fluorine at $R_1$.

Preferably, $C_1(r)$ decreases with increasing radius from r=0 to r=$R_1$, and $C_2(r)$ increases with increasing radius from r=0 to r=$R_1$. More preferably, $C_1(r)$ monotonically decreases with increasing radius from r=0 to r=$R_1$, and $C_2(r)$ monotonically increases with increasing radius from r=0 to r=$R_1$. Even more preferably, $C_1(r)$ decreases with increasing radius from r=0 to r=$R_1$, and $C_{11}$ is nonzero, and $C_2(r)$ increases with increasing radius from r=0 to r=R, and $C_{21}$=0. Still more preferably, $C_1(r)$ monotonically decreases with increasing radius from r=0 to r=$R_1$, and $C_{11}$ is nonzero, and $C_2(r)$ monotonically increases with increasing radius from r=0 to r=$R_1$, and $C_{21}$=0.

EXAMPLE 1

Comparative

Figure 2:
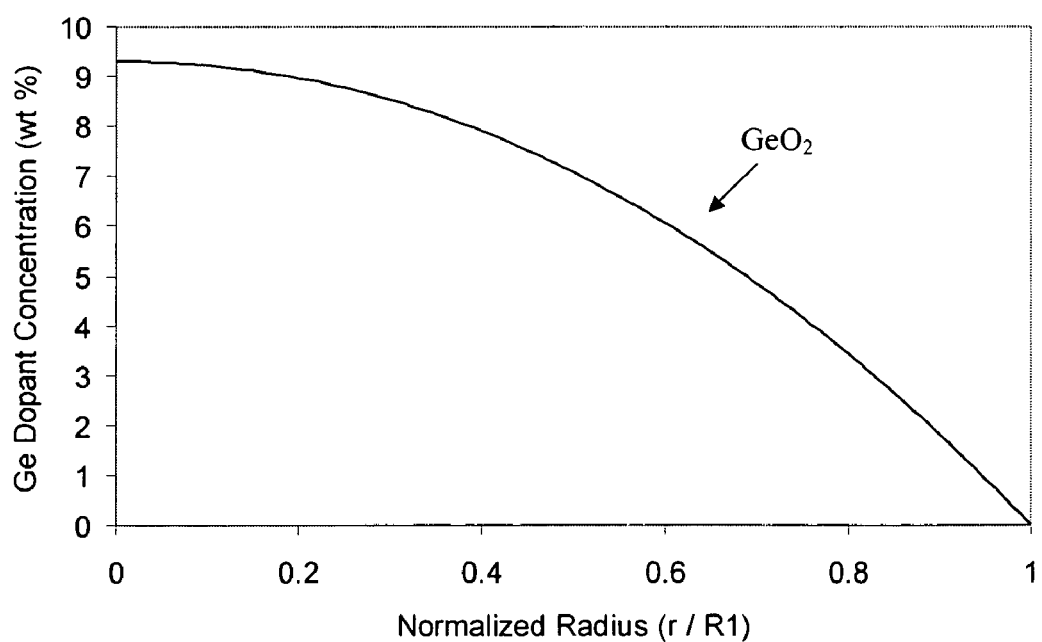
FIG. 2 schematically depicts the dopant concentration profile in the core of a comparative graded index multimode fiber with only germania in the core.
Figure 3:
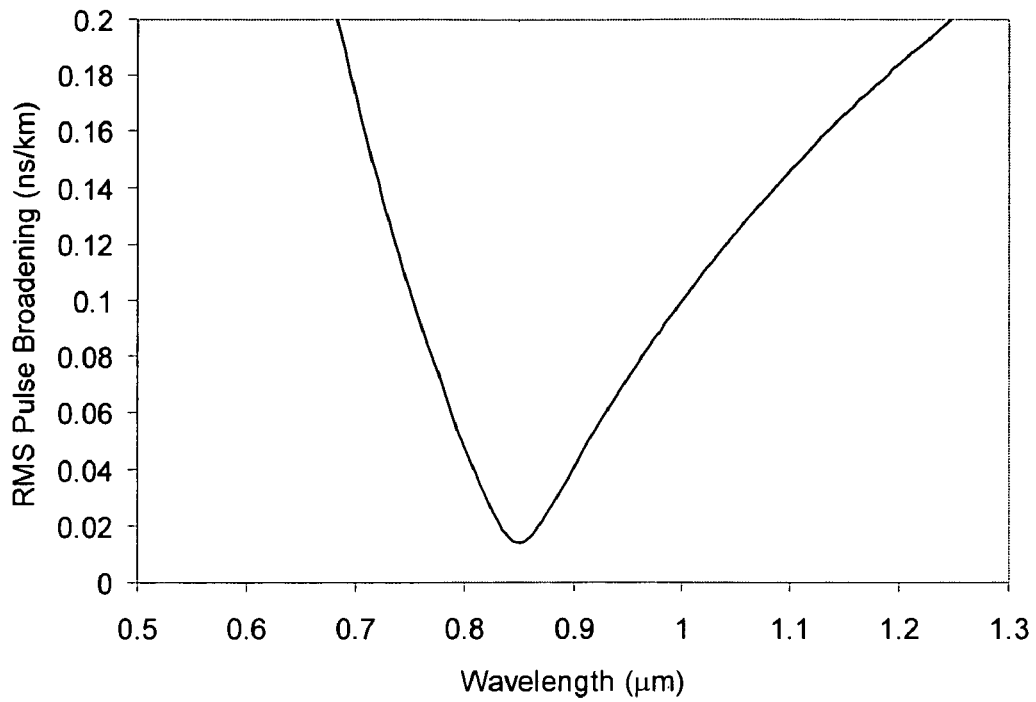
FIG. 3 shows the root mean square (RMS) pulse broadening as a function of wavelength for the fiber of FIG. 2

FIG. 2 schematically depicts the germania dopant concentration profile in the core of a multimode fiber with a graded index refractive index profile intended for operation at 0.85 μm. FIG. 3 shows the root mean square (RMS) pulse broadening as a function of wavelength for the fiber of FIG. 2. The pulse width reaches a minimum at the wavelength of 0.85 μm. For wavelengths away from 0.85 μm, the pulse width increases very rapidly, i.e. the bandwidth decreases.

The RMS pulse broadening is less than 0.02 ns/km for all wavelengths between about 0.84 µm and about 0.86 µm, i.e. over a wavelength window width of about 0.02 µm, and over a wavelength window width of 0.02 µm centered at 0.85 µm.

EXAMPLE 2

Figure 4:
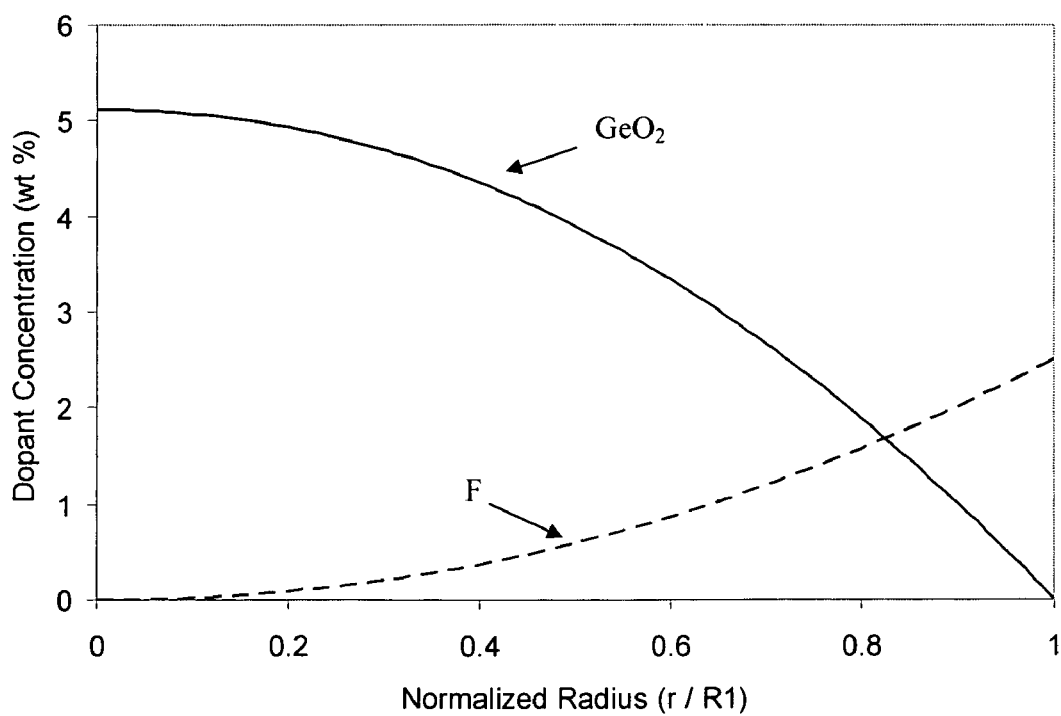
FIG. 4 schematically depicts the germania and fluorine dopant concentration profiles for one embodiment of a multimode optical fiber disclosed herein.
Figure 5:
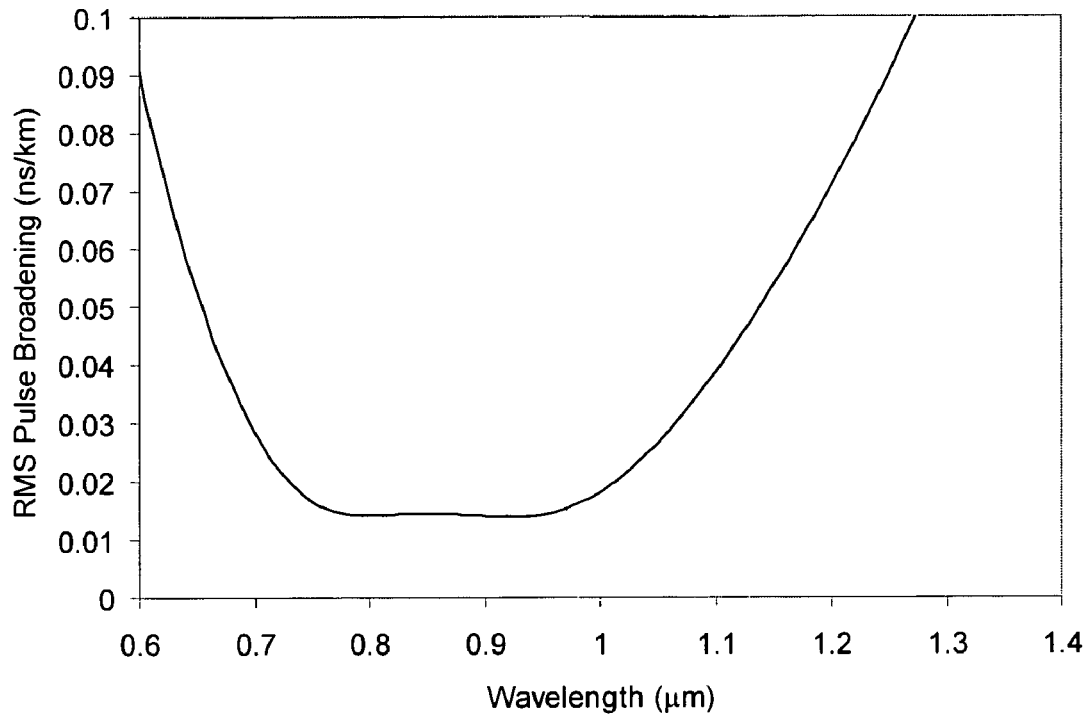
FIG. 5 schematically illustrates the RMS pulse width of the fiber of FIG. 4.

FIG. 4 schematically depicts the germania and fluorine dopant concentration profiles, shown as "GeO$_2$" and "F", respectively, for a multimode optical fiber exemplary of the fibers disclosed herein. Here, $\alpha1=\alpha2=2.0708$, $C_{11}=5.1$ wt % germania, $C_{22}=2.5$ wt % fluorine, $C_{12}=0$, $C_{21}=0$, $x_1=0.5$, $x_2=0.5$, and $R_1=25$ µm. FIG. 5 schematically illustrates the RMS pulse width of the fiber of FIG. 4 at various wavelengths. The RMS pulse broadening is less than 0.02 ns/km for all wavelengths between about 0.75 µm and about 1.0 µm, i.e. over a wavelength window width of about 0.25 µm, and over a wavelength window width of at least 0.20 µm centered at 0.85 µm. Thus, the bandwidth of Example 2 is about 5 times as large as the bandwidth of comparative Example 1.

EXAMPLE 3

Comparative

Figure 6:
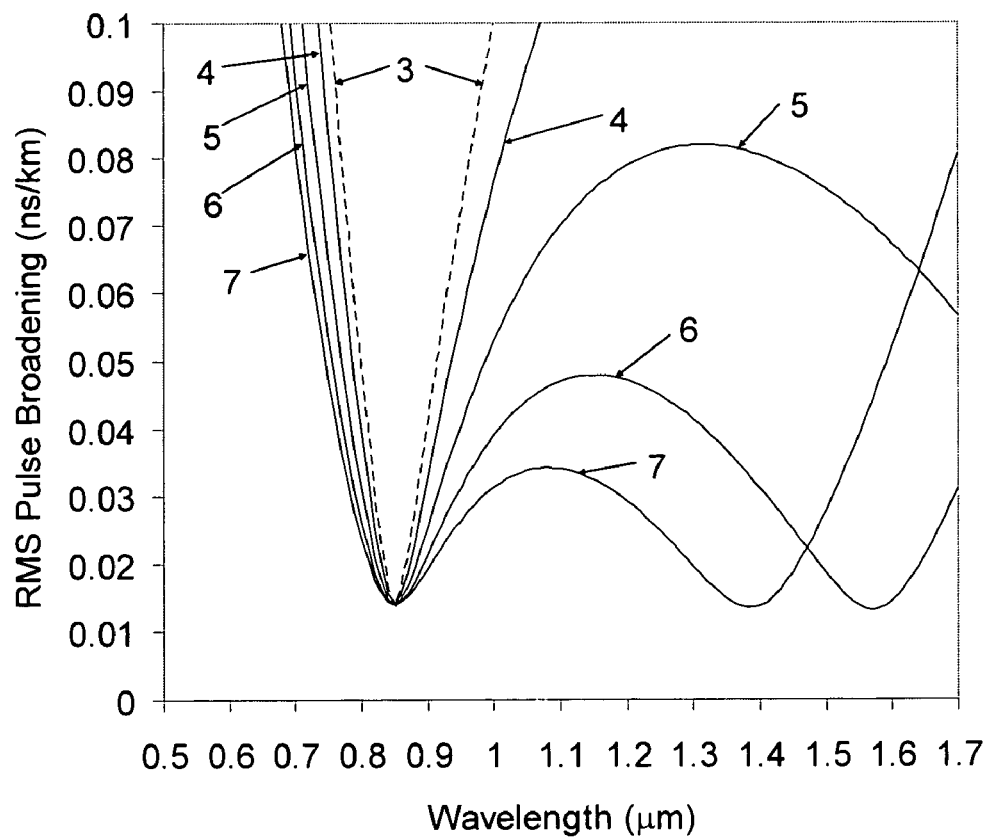
FIG. 6 schematically illustrates the RMS pulse width at various wavelengths of four embodiments of the multimode fiber disclosed herein and of a comparative fiber having only germania and no fluorine in the core.

FIG. 6 schematically illustrates the RMS pulse width at various wavelengths of a comparative fiber having only germania and no fluorine in the core, shown as curve 3. Here, $\alpha1=\alpha2=2.0649$ $C_{11}=16.2$ wt % germania and $C_{22}=0$ wt % fluorine, $C_{12}=0$, $C_{21}$, $=0$, $x_1=0.5$, $x_2=0.5$, and $R_1=25$ µm. The RMS pulse broadening is less than 0.02 ns/km for all wavelengths between about 0.84 µm and about 0.86 µm, i.e. over a wavelength window width of about 0.02 µm, and over a wavelength window width of 0.02 µm centered at 0.85 µm.

EXAMPLE 4

FIG. 6 also schematically illustrates the RMS pulse width of a multimode optical fiber exemplary of the fibers disclosed herein, having dopant concentration profiles similar in shape to FIG. 4, shown as curve 4. Here, $\alpha1=\alpha2=2.0637$, $x_1=0.5$, $x_2=0.5$, $R_1=25$ µm $C_{12}=0$, $C_{21}=0$, $C_{11}=14.1$ wt % germania, and $C_{22}=0.5$ wt % fluorine. The RMS pulse broadening is less than 0.02 ns/km for all wavelengths between about 0.83 µm and about 0.87 µm, i.e. over a wavelength window width of about 0.04 µm, and over a wavelength window width of 0.04 µm centered at about 0.85 µm.

EXAMPLES 5, 6, 7

FIG. 6 also schematically illustrates the RMS pulse width of three multimode optical fibers exemplary of the fibers disclosed herein, shown as curves 5, 6, and 7, having dopant concentration profiles similar in shape to FIG. 4. For each of these examples, $\alpha1=\alpha2=2.06367, 2.06429, 2.06489$, respectively, $C_{12}=0$, $C_{21}=0$, $x_1=0.5$, $x_2=0.5$, and $R_1=25$ µm. $C_{11}=11.8, 10.4,$ and $9.6$ wt % germania, and $C_{22}=1.0, 1.3,$ and $1.5$ wt % fluorine, respectively for Examples 5, 6, 7. Example 5 has a window width of about 50 nm centered at about 0.85 µm (less than 0.02 ns/km from 0.83 to 0.88 µm) and a second window above 1.7 µm. Examples 6 and 7 have RMS pulse broadening of less than 0.02 ns/km over wavelength window widths of at least 50 nm in at least two windows, one of the windows being at 0.85 µm: Example 6 has a window width of about 70 nm centered at about 0.85 µm (less than 0.02 ns/km from 0.82 to 0.89 µm) and a window width of about 150 nm centered at about 1.56 µm (less than 0.02 ns/km from 1.49 to 1.64 µm); and Example 7 has a window width of about 80 nm centered at about 0.85 µm (less than 0.02 ns/km from 0.82 to 0.90 µm) and a window width of about 140 nm centered at about 1.37 µm (less than 0.02 ns/km from 1.30 to 1.44 µm).

EXAMPLES 8, 9, 10

Figure 7:
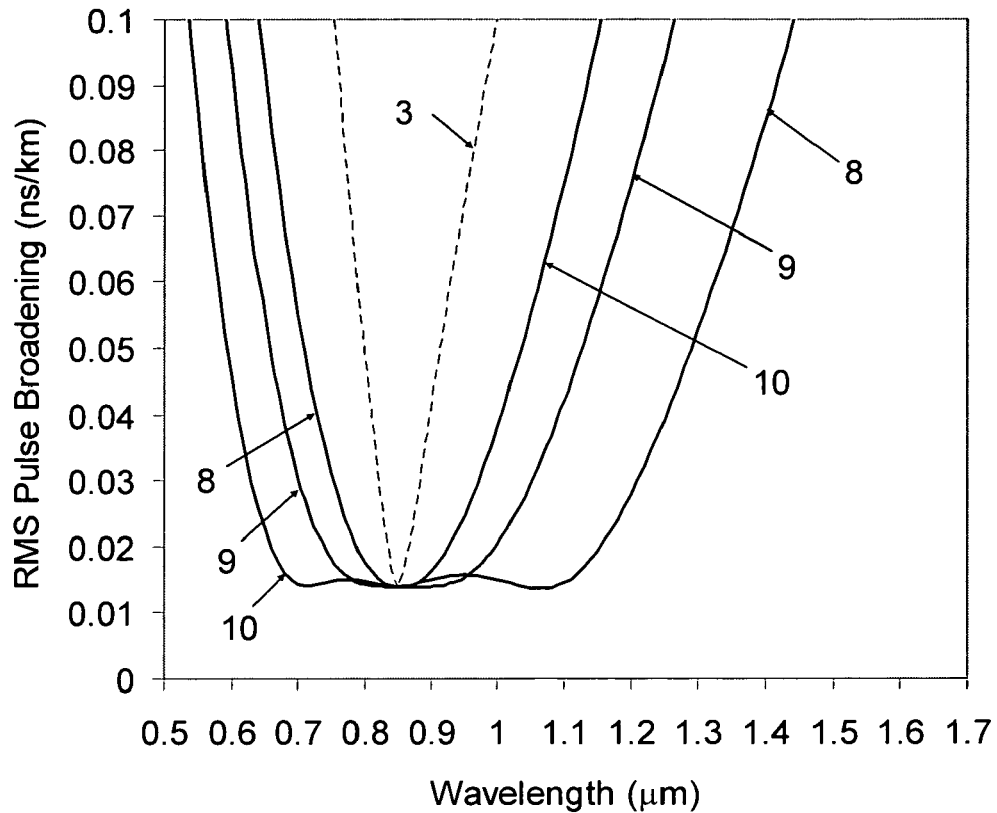
FIG. 7 schematically illustrates the RMS pulse width at various wavelengths of three other embodiments of the multimode fiber disclosed herein and of a comparative fiber having only germania and no fluorine in the core.

FIG. 7 schematically illustrates the RMS pulse width of three multimode optical fibers exemplary of the fibers disclosed herein, shown as curves 8, 9, and 10, having dopant concentration profiles similar in shape to FIG. 4. For each of these examples, $\alpha1=\alpha2=2.06733, 2.07099, 2.07587$, respectively, $C_{12}=0$, $C_{21}=0$, $x_1=0.5$, $x_2=0.5$, and $R_1=25$ µm. $C_{11}=7.3, 5.0,$ and $2.8$ wt % germania, and $C_{22}=2.0, 2.5,$ and $3.0$ wt % fluorine, respectively for Examples 8, 9, 10. FIG. 7 shows RMS pulse broadening of less than 0.02 ns/km over wavelength window widths of at least 100 nm in a window centered at 0.85 µm: Example 8 has a window width of about 120 nm centered at about 0.85 µm, and an extended window width of 360 nm, the extended window width including 0.85 µm even though the window is not centered at 0.85 µm (less than 0.02 ns/km from 0.79 to 1.15 µm); Example 9 has a window width of about 220 nm centered at about 0.85 µm, and an extended window width of 250 nm, the extended window width including 0.85 µm but not centered at 0.85 µm (less than 0.02 ns/km from 0.74 to 0.99 µm); and Example 10 has a window width of about 140 nm centered at about 0.85 µm, and an extended window width of 260 nm, the extended window width including 0.85 µm but not centered at 0.85 µm (less than 0.02 ns/km from 0.66 to 0.92 µm). FIG. 7 also shows curve 3 of Example 3 for comparison.

EXAMPLE 11

Figure 8:
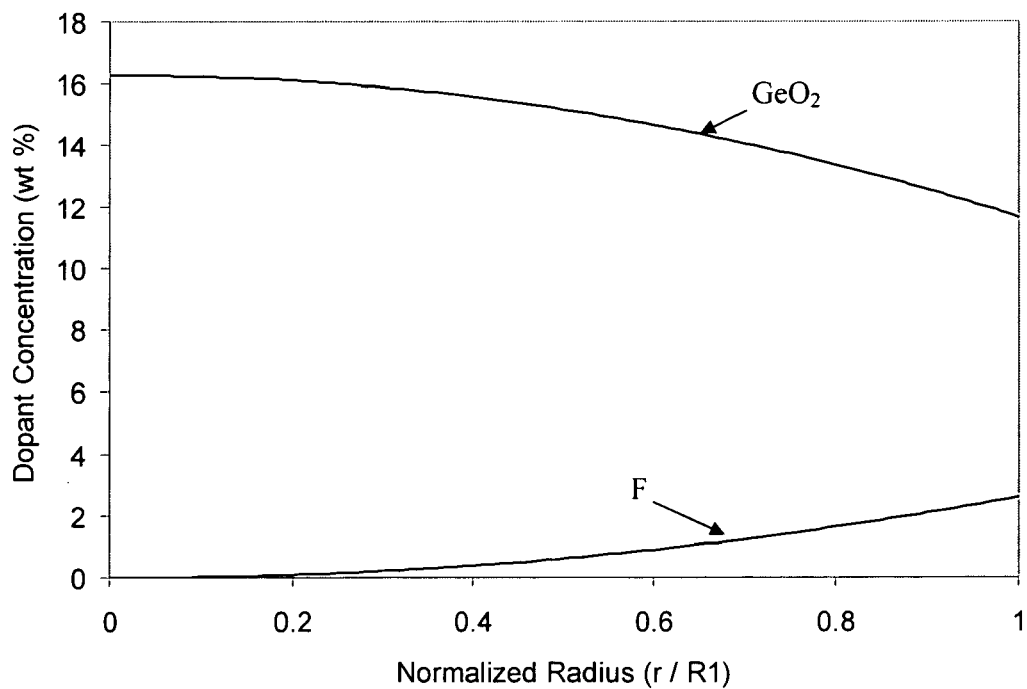
FIG. 8 schematically depicts the germania and fluorine dopant concentration profiles for another embodiment of a multimode optical fiber disclosed herein.
Figure 9:
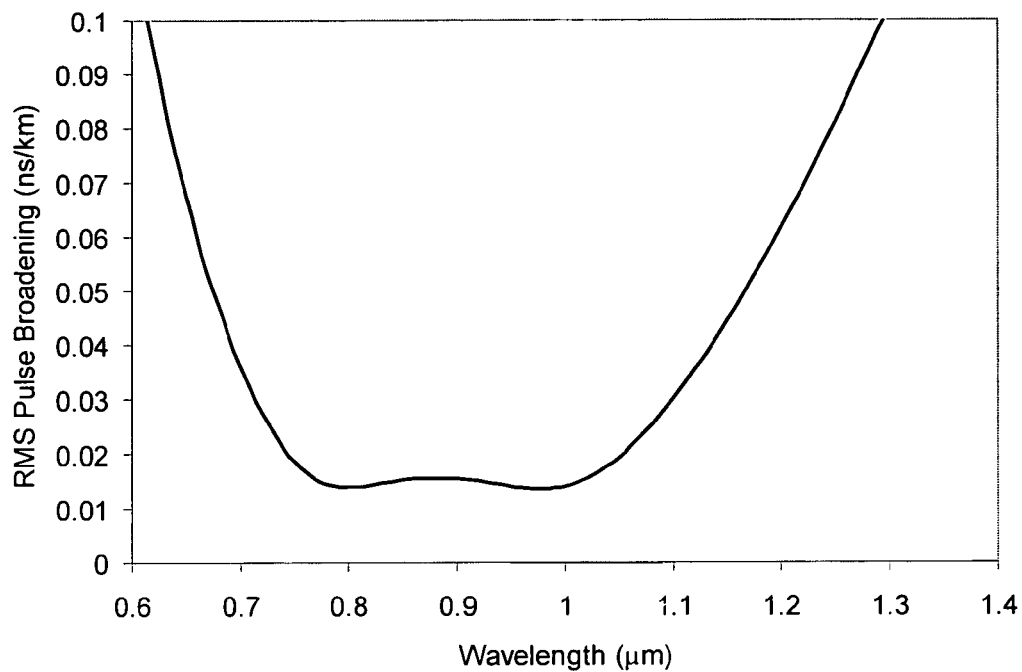
FIG. 9 schematically illustrates the RMS pulse width of the fiber of FIG. 8 at various wavelengths.

FIG. 8 schematically depicts the germania and fluorine dopant concentration profiles for a multimode optical fiber exemplary of the fibers disclosed herein. Here, $\alpha1=\alpha2=2.0836$, $C_{11}=16.3$ wt % germania, $C_{22}=2.6$ wt % fluorine, $C_{12}=11.7$ wt % germania, $C_{21}=0$ wt % fluorine, $x_1=0.5$, $x_2=0.5$, and $R_1=25$ µm. FIG. 9 schematically illustrates the RMS pulse width of the fiber of FIG. 8 at various wavelengths. The RMS pulse broadening is less than 0.02 ns/km for all wavelengths between about 0.75 µm and about 1.05 µm, i.e. over a wavelength window width of about 300 nm, and over a wavelength window width of at least 200 nm centered at 0.85 µm. For MMF such as this example, the cladding preferably consists of silica because the resultant refractive index of the core, due to the combined presence of the germania and the fluorine, has a refractive index substantially equal to pure silica.

EXAMPLE 12

Figure 10:
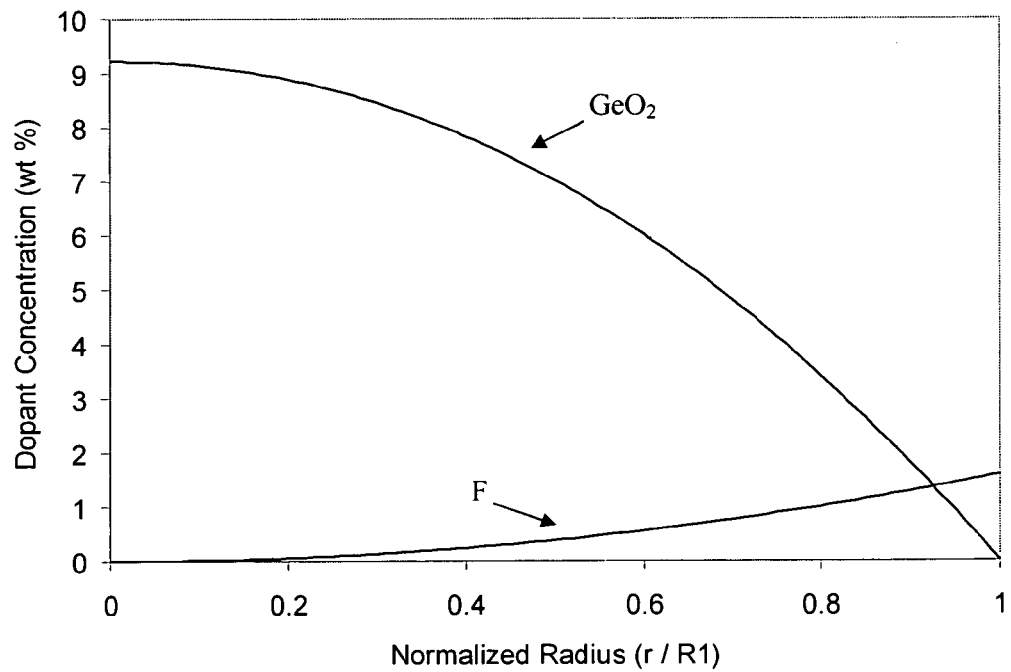
FIG. 10 schematically depicts the germania and fluorine dopant concentration profiles for another embodiment of a multimode optical fiber disclosed herein.
Figure 11:
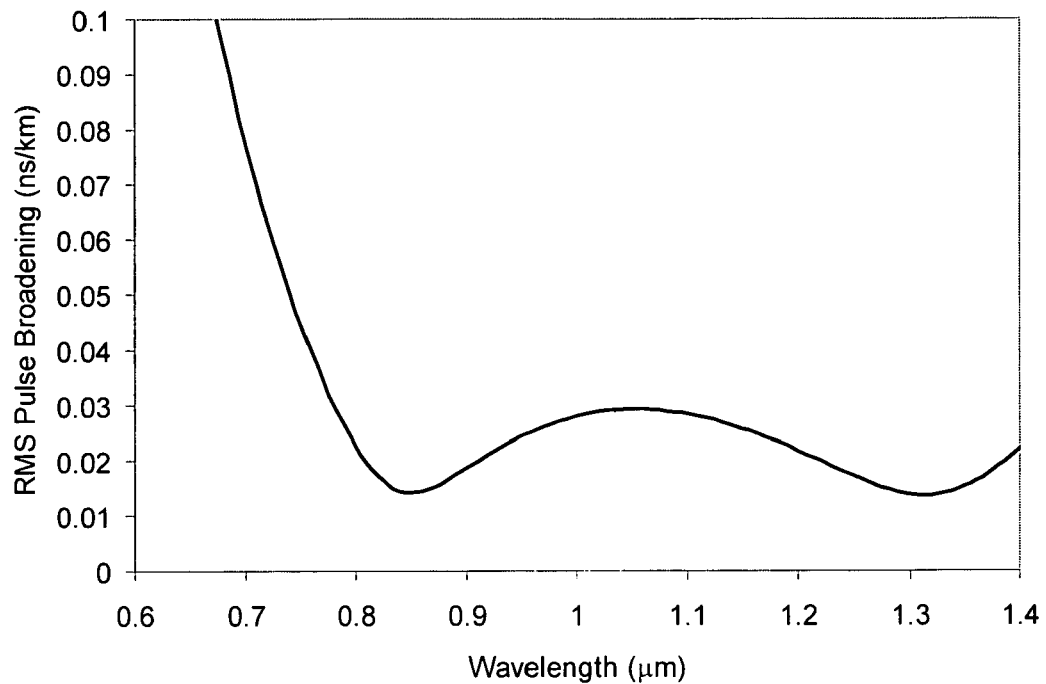
FIG. 11 schematically illustrates the RMS pulse width of the fiber of FIG. 10 at various wavelengths.

FIG. 10 schematically depicts the germania and fluorine dopant concentration profiles for a multimode optical fiber exemplary of the fibers disclosed herein. Here, $\alpha1=\alpha2=2.0651$, $C_{11}=9.2$ wt % germania, $C_{22}=1.6$ wt % fluorine, $C_{12}=0$ wt % germania, $C_{21}=0$ wt % fluorine, $x_1=0.5$, $x_2=0.5$, and $R_1=25$ µm. FIG. 11 schematically illustrates the RMS pulse width of the fiber of FIG. 10 at various wavelengths. Example 12 has RMS pulse broadening of less than 0.02 ns/km over wavelength window widths of at least 50 nm in at least two windows, one of the windows being at 0.85 µm: a window width of at least about 90 nm centered at about 0.85 µm (less than 0.02 ns/km from 0.81 to 0.91 µm) and a window width of about 160 nm centered at about 1.30 µm (less than 0.02 ns/km from 1.22 to 1.38 µm). For MMF such as this example, the cladding is preferably doped with fluorine to match the refractive index of the core at $R_1$.

EXAMPLE 13

Figure 12:
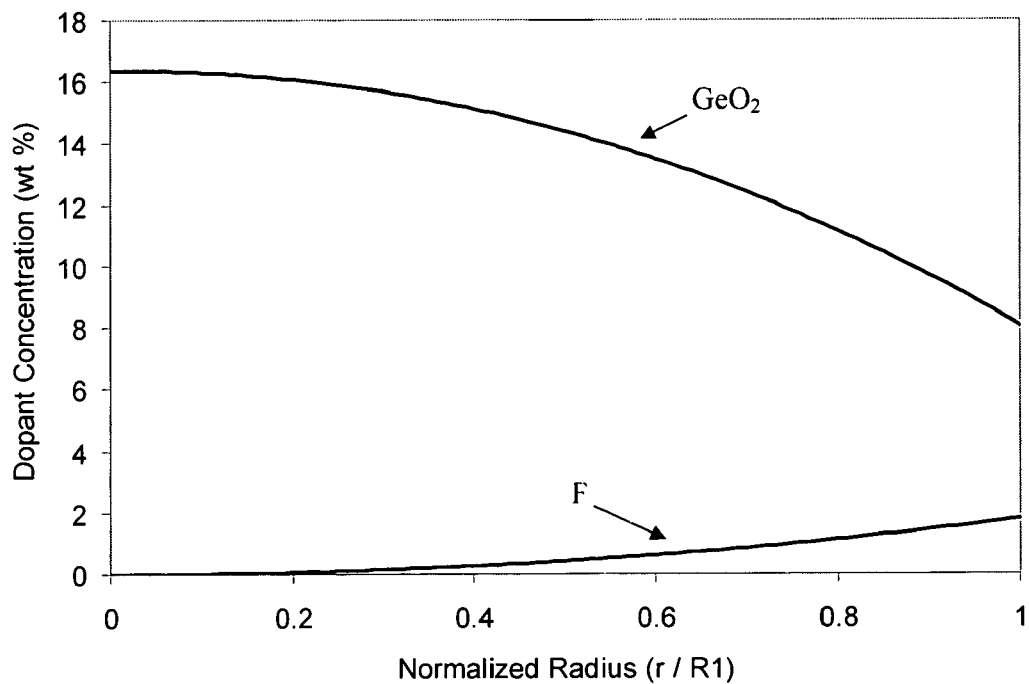
FIG. 12 schematically depicts the germania and fluorine dopant concentration profiles for another embodiment of a multimode optical fiber disclosed herein.
Figure 13:
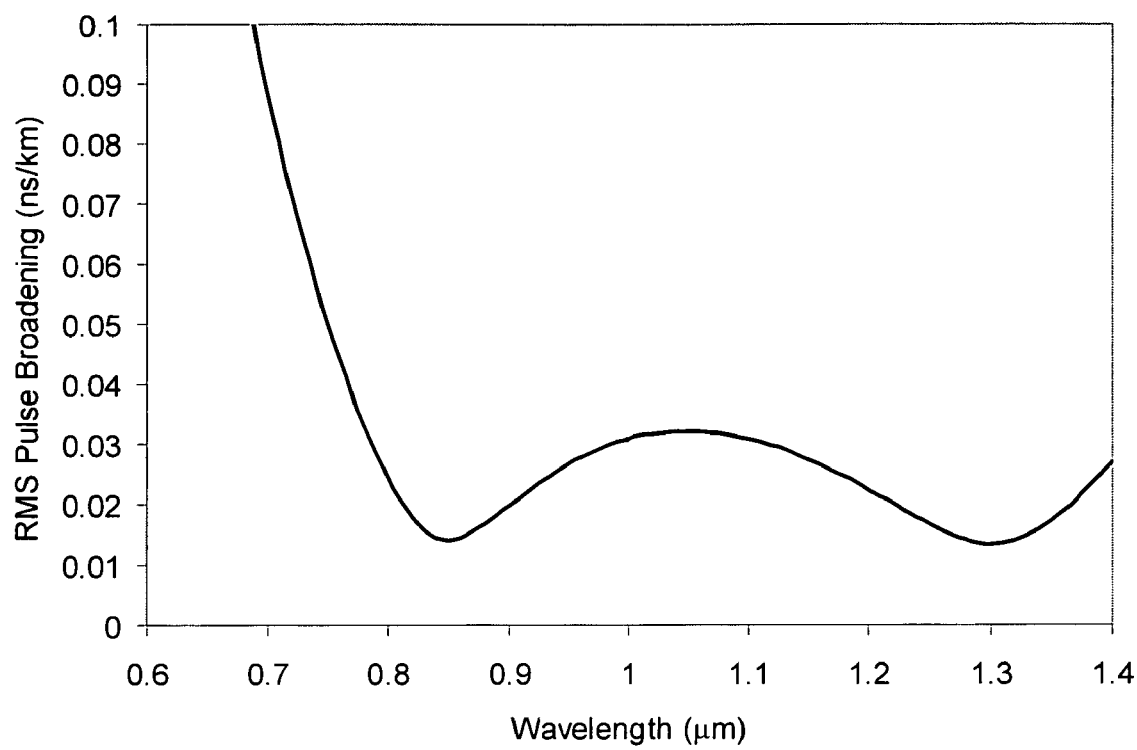
FIG. 13 schematically illustrates the RMS pulse width of the fiber of FIG. 12 at various wavelengths.

FIG. 12 schematically depicts the germania and fluorine dopant concentration profiles for a multimode optical fiber exemplary of the fibers disclosed herein. Here, $\alpha1=\alpha2=2.0809$, $C_{11}=16.4$ wt % germania, $C_{22}=1.8$ wt % fluorine, $C_{12}=8.1$ wt % germania, $C_{21}=0$ wt % fluorine, $x_1=0.5$, $x_2=0.5$, and $R_1=25$ µm. FIG. 13 schematically illustrates the RMS pulse width of the fiber of FIG. 12 at various wavelengths. Example 13 has RMS pulse broadening of less than 0.02 ns/km over wavelength window widths of at least 50 nm in at least two windows, one of the windows being at 0.85 µm: a window width of at least about 70 nm centered at about 0.85 µm (less than 0.02 ns/km from 0.82 to 0.90 µm) and a window width of about 130 nm centered at about 1.30 µm (less than 0.02 ns/km from 1.23 to 1.36 µm).

For all of the optical fiber disclosed herein, we have found that the dopant profile parameters, $x_1$ and $x_2$, are preferably each between −10 and +10. In some embodiments, $-4 \leq x_1 \leq 4$ and $-4 \leq x_2 \leq 4$, and values in these ranges for the dopant profile parameters are robust with respect to widening an operating window or permitting a second operating window for various combinations of different $x_1$ and $x_2$ within these ranges. In other embodiments, $x_1$ is between −10 and −4 and $x_2$ is not within ±2 of $x_1$, i.e. $-10 \leq x_1 \leq -4$, and $x_2$ is either less than $x_1-2$ or $x_2$ is greater than $x_1+2$. In other embodiments, $x_1$ is between 4 and 10 and $x_2$ is not within ±2 of $x_1$, i.e. $4 \leq x_1 \leq 10$, and $x_2$ is either less than $x_1-2$ or $x_2$ is greater than $x_1+2$. In any case, $-10 \leq x_2 < +10$.

EXAMPLES 14-24

Figure 14:
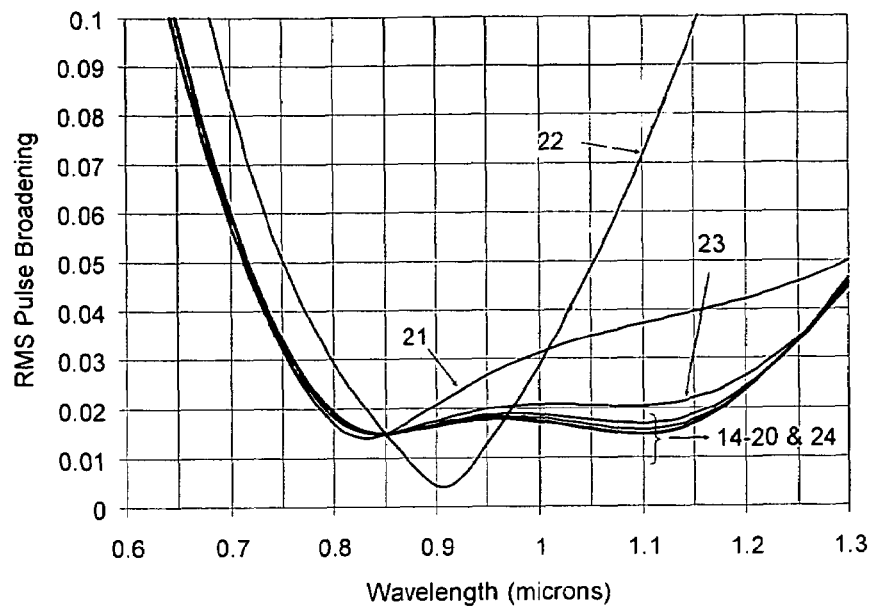
FIG. 14 schematically illustrates the RMS pulse width of eleven additional embodiments (Examples 14-24) at various wavelengths.

FIG. 14 schematically illustrates the RMS pulse width of multimode optical fiber examples 14-24 of the fibers disclosed herein which have $x_1=6$, i.e. $4 \leq x_1 \leq 10$, and $x_2$ values ranging from −10 to +10. Examples 14-21 and 23-24 have germania and fluorine dopant concentration profiles with $C_{11}=4.5$ wt % germania, $C_{22}=2.0$ wt % fluorine, $C_{12}=0$ wt % germania, and $C_{21}=0$ wt % fluorine. Example 22 has germania and fluorine dopant concentration profiles with $C_{11}=5.5$ wt % germania, $C_{22}=3.0$ wt % fluorine, $C_{12}=1$ wt % germania, and $C_{21}=1$ wt % fluorine. All of the Examples 14-24 have $R_1=25$ µm, and the following values for $x_1$, $x_2$, $\alpha1$, and $\alpha2$:

| Example | $x_1$ | $x_2$ | $\alpha1$ | $\alpha2$ |
|---|---|---|---|---|
| 14 | 6 | −10 | 2.07174 | 2.07112 |
| 15 | 6 | −8 | 2.07012 | 2.06963 |
| 16 | 6 | −6 | 2.06788 | 2.06765 |
| 17 | 6 | −4 | 2.06457 | 2.06490 |
| 18 | 6 | −2 | 2.05919 | 2.06083 |
| 19 | 6 | 0 | 2.04892 | 2.05415 |
| 20 | 6 | 2 | 2.02148 | 2.04123 |
| 21 | 6 | 4 | 1.71618 | 2.00058 |
| 22 | 6 | 6 | 2.1559 | 1.58664 |
| 23 | 6 | 8 | 2.12181 | 2.18213 |
| 24 | 6 | 10 | 2.10752 | 2.12826 |

Figure 15:
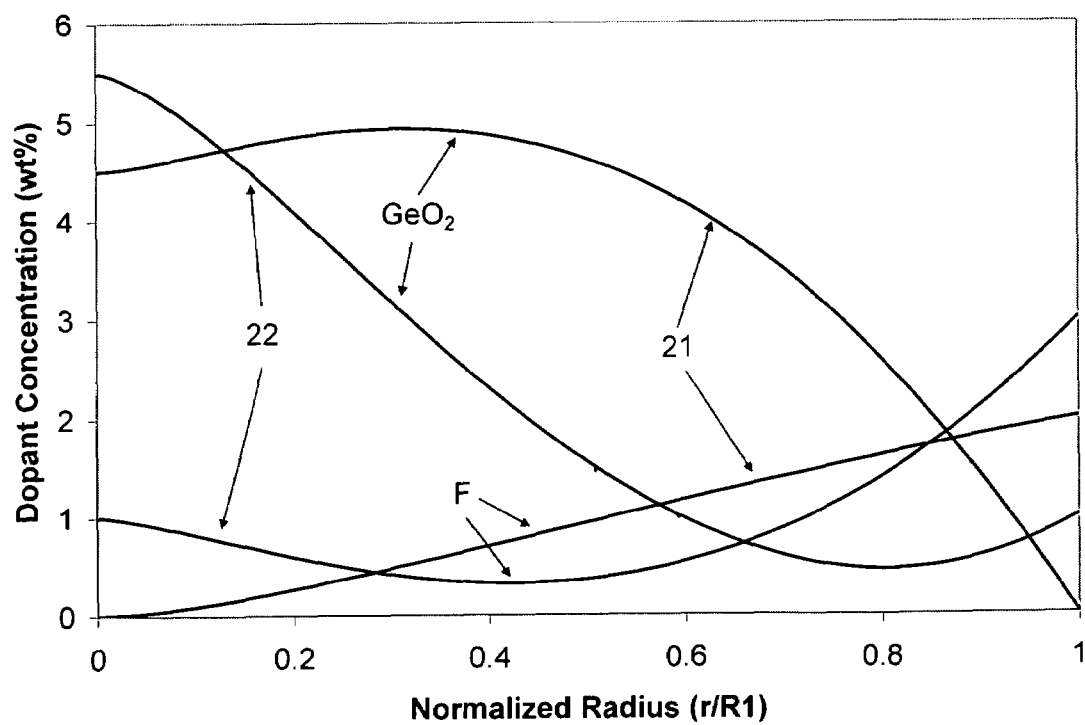
FIG. 15 schematically depicts the germania and fluorine dopant concentration profiles for two of the multimode optical fiber embodiments (Examples 21 & 22) disclosed herein.

Values for $\alpha1$ an $\alpha2$ for Examples 14-20 and 23-24 are very close to each other. These examples have parabolic-like dopant profiles similar to FIG. 10. On the other hand, Examples 21 and 22 have very different values for $\alpha1$ an $\alpha2$ and their dopant profiles are not parabolic. FIG. 15 shows dopant profiles for germania and fluorine for Examples 21 and 22.

Examples 14-20 and 24 have RMS pulse broadening of less than 0.02 ns/km for all wavelengths between about 0.80 µm and about 1.16 µm, i.e. over a wavelength window width of about 0.36µm, and over a wavelength window width of at least 100 nm centered at 0.85 µm. For Examples 14-20 and 24, $x_1$ is between 4 and 10, and $x_2$ is not within ±2 of $x_1$, i.e. $4 \leq x_1 \leq 10$, and $x_2$ is either less than $x_1-2$ or $x_2$ is greater than $x_1+2$.

On the other hand, Examples 21, 22, and 23 have RMS pulse broadening of less than 0.02 ns/km for all wavelengths between: about 0.79 µm and about 0.89 µm, i.e. over a wavelength window width of about 0.10 µm, for Example 21; about 0.83 µm and about 0.97 µm, i.e. over a wavelength window width of about 0.14 µm, for Example 22; about 0.79 µm and about 0.95 µm, i.e. over a wavelength window width of about 0.16 µm, for Example 23. The wavelength window with RMS pulse broadening of less than 0.02 ns/km of Example 22 is centered at about 0.91 µm, and only has a smaller wavelength window with RMS pulse broadening less than 0.02 ns/km centered at 0.85 µm from about 0.83 µm to about 0.87 µm, i.e. a smaller wavelength window width of about 40 nm centered at 0.85 µm. However, the minimum pulse broadening for Example 22 is about 0.005 ns/km, about three times lower than the other examples, and therefore such embodiments can provide higher bandwidth over a relatively smaller window: Example 22 provides RMS pulse broadening of less than 0.01 ns/km over a 70 nm window (from 0.87 to 0.94 µm), and less than 0.01 ns/km over a 60 nm window centered at 0.9 µm (from 0.87 to 0.93 µm). For Examples 21, 22, and 23, $x_1$ is between 4 and 10, but $x_2$ is within ±2 of $x_1$, i.e. $4 \leq x_1 \leq 10$, and $x_2$ is greater than nor equal to $x_1-2$ or $x_2$ is less than or equal to $x_1+2$. As shown in FIG. 15, the maximum germania concentration for Example 21 does not occur at the centerline of the fiber, rather the germania concentration increases from 4.5 wt-% at the centerline to a maximum concentration of 4.9 wt-% at $r/R_1=0.31$, and then the germania concentration decreases to 0 wt-% at $r/R_1=1$; also, the fluorine concentration increases monotonically from 0 wt % at r=0 to a maximum 2 wt-% at $r/R_1=1$. In Example 22, the minimum germania concentration does not occur at $r/R_1=1$, rather the germania concentration decreases from a maximum of 5.5 wt-% at the centerline to a minimum concentration of 0.46 wt-% at $r/R_1=0.80$, and then the germania concentration increases to 1.0 wt-% at $r/R_1=1$; also, the minimum fluorine concentration does not occur at $r/R_1=0$ or at $r/R_1=1$, rather the fluorine concentration decreases from 1 wt-% at r=0 to a minimum concentration of 0.32 wt-% at $r/R_1=0.43$, then increases to a maximum of 3 wt-% at $r/R_1=1$.

In some embodiments, the optical fiber disclosed herein comprises a refractive index profile providing a minimum RMS pulse broadening of less than about 0.01 ns/km. In some embodiments, the refractive index profile provides a minimum RMS pulse broadening of about 0.005 ns/km.

In some embodiments of the optical fiber disclosed herein, $C_2(r) \leq 4$ wt % fluorine. In one set of these embodiments, 1 wt% fluorine $\leq C_2(r) \leq 4$ wt % fluorine. In another set of these embodiments, 0 wt% fluorine $\leq C_2(r) \leq 3$ wt % fluorine. In another set of these embodiments, 0 wt% fluorine $\leq C_2(r) \leq 2$ wt % fluorine.

In some embodiments of the optical fiber disclosed herein, $C_1(r) \leq 20$ wt % germania. In one set of these embodiments, 0 wt% germania≦$C_1$, (r)≦10 wt % germania. In another set of these embodiments, 0 wt% germania≦$C_1$, (r)≦6 wt % germania. In another set of these embodiments, 8 wt% germania≦$C_1$, (r)≦18 wt % germania. In yet another set of these embodiments, 10 wt% germania≦$C_1$ (r)≦18 wt % germania.

In some embodiments of the optical fiber disclosed herein, the cladding comprises pure silica. In other embodiments, the cladding comprises fluorine with a cladding fluorine concentration $C_3(r)$, preferably with $C_3(r)$ being substantially equal to $C_{22}$ proximate the core, and preferably $C_3(r)$ is substantially constant throughout substantially all of the cladding.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A graded index multimode optical fiber comprising:
a core comprising silica doped with germania and fluorine, the core extending from a centerline at r=0 to an outermost core radius, $R_1$; and
a cladding surrounding and in contact with the core;
wherein the germania is disposed in the core with a germania dopant concentration profile, $C_1(r)$, and the core has a center germania concentration at the centerline, $C_{11}$, greater than or equal to 0, and an outermost germania concentration $C_{12}$, at $R_1$, wherein $C_{12}$ is greater than or equal to 0;
wherein the fluorine is disposed in the core with a fluorine dopant concentration profile, $C_2(r)$, and the core has a center fluorine concentration at the centerline, $C_{21}$, greater than or equal to 0, and an outermost fluorine concentration $C_{22}$, at $R_1$, wherein $C_{22}$ is greater than or equal to 0;
wherein $C_1(r)=C_{11}-(C_{11}-C_{12})(1-x_1)r^{\alpha 1}-(C_{11}-C_{12})x_1 r^{\alpha 2}$;
wherein $C_2(r)=C_{21}-(C_{21}-C_{22})x_2 r^{\alpha 1}-(C_{21}-C_{22})(1-x_2)r^{\alpha 2}$;
wherein $1.9<\alpha 1<2.1$, $1.9<\alpha 2<2.1$; and
wherein $-10<x_1<10$ and $-10<x_2<10$.

2. The optical fiber of claim 1 wherein $-4<x_1<4$ and $-4<x_2<4$.

3. The optical fiber of claim 1 wherein $-10<x_1<-4$, and wherein $x_2<x_1-2$ or $x_2>x_1+2$.

4. The optical fiber of claim 1 wherein $4<x_1<10$, and wherein $x_2<x_1-2$ or $x_2>x_1+2$.

5. The optical fiber of claim 1 wherein $C_{22}$ is greater than 0 and $C_{12}$ is equal to 0.

6. The optical fiber of claim 1 wherein $C_{22}$ is greater than 0 and $C_{12}$ is greater than 0.

7. The optical fiber of claim 1 wherein the cladding comprises fluorine.

8. The optical fiber of claim 1 wherein the cladding comprises pure silica.

9. The optical fiber of claim 1 wherein $C_2(r)≦4$ wt % fluorine for all radii from r=0 to r=$R_1$.

10. The optical fiber of claim 1 wherein $C_1(r)≦20$ wt % germania for all radii from r=0 to r=$R_1$.

11. The optical fiber of claim 1 wherein the optical fiber comprises a refractive index profile which provides an RMS pulse broadening of less than 0.02 ns/km over a wavelength window width of at least 0.04 μm, wherein the window is centered at about 0.85 μm.

12. The optical fiber of claim 1 wherein the optical fiber comprises a refractive index profile which provides an RMS pulse broadening of less than 0.02 ns/km over a wavelength window width of at least 0.10 μm, wherein the window is centered at about 0.85 μm.

13. The optical fiber of claim 1 wherein the optical fiber comprises a refractive index profile which provides an RMS pulse broadening of less than 0.02 ns/km over wavelength window widths of at least 50 nm in at least two windows.

14. The optical fiber of claim 1 wherein the optical fiber comprises a refractive index profile which provides an RMS pulse broadening of less than 0.02 ns/km over wavelength window widths of at least 50 nm in first and second windows, the first window being centered at about 0.85 μm and the second window being centered between about 1.1 μm and 1.6 μm.

15. The optical fiber of claim 1 wherein the concentration of fluorine at the centerline is essentially zero, and the concentration of fluorine increases with radius within the core.

16. The optical fiber of claim 15 wherein the concentration of germania at the centerline is greater than 1 wt-%.

17. The optical fiber of claim 16 wherein the concentration of germania at $R_1$ is greater than 1 wt-%.

18. The optical fiber of claim 16 wherein the concentration of germania at $R_1$ is less than 0.1 wt-%.

19. The optical fiber of claim 1 wherein the optical fiber comprises a refractive index profile providing a minimum RMS pulse broadening of less than about 0.01 ns/lkm.

20. The optical fiber of claim 1 wherein the optical fiber comprises a refractive index profile providing a minimum RMS pulse broadening of about 0.005 ns/km.

* * * * *